UNITED STATES PATENT OFFICE.

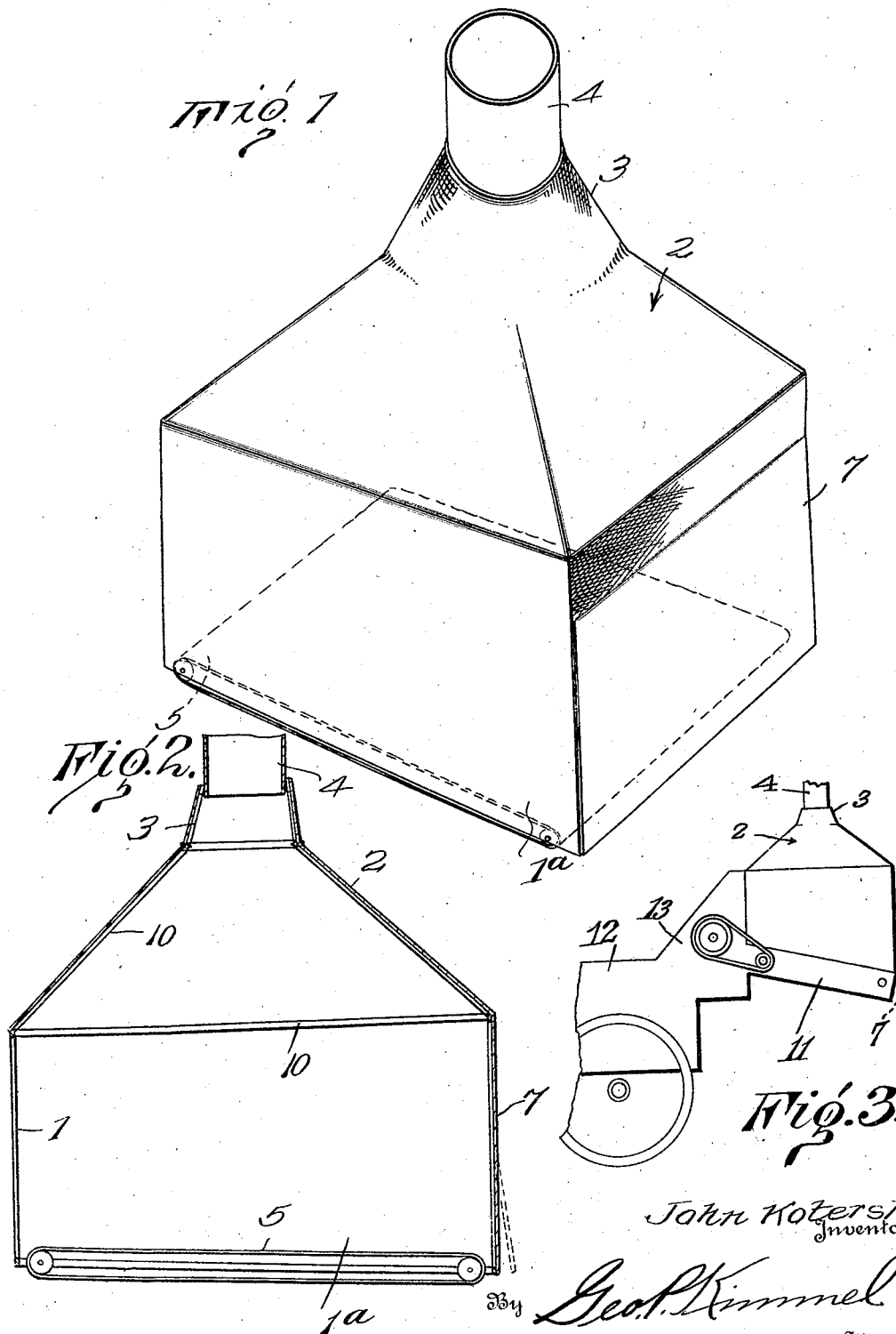

JOHN KOTERSKE, OF SELDEN, KANSAS.

DUST-CONVEYING ATTACHMENT FOR THRESHING-MACHINES.

1,401,710.        Specification of Letters Patent.     Patented Dec. 27, 1921.

Application filed March 1, 1917, Serial No. 151,750. Renewed May 14, 1921. Serial No. 469,494.

*To all whom it may concern:*

Be it known that I, JOHN KOTERSKE, a citizen of the United States, and resident of Selden, in the county of Sheridan and State of Kansas, have invented certain new and useful Improvements in Dust-Conveying Attachments for Threshing-Machines, of which the following is a specification.

This invention relates to improvements in attachments for threshing machines and has for its primary object to provide a device designed for application over the feeding conveyer of a threshing machine for preventing scattering of dust produced during the feeding of the bundles of grain to the threshing machine whereby to protect the operator and prevent interference with his work by the cloud of dust usually present at the feeding end of threshing machines.

With this and other objects in view, the invention consists in certain novel features of construction as hereinafter shown and described and then specifically pointed out in the claims, and in the drawings illustrative of the preferred embodiment of the invention, Figure 1 represents a perspective view of the improved hood illustrating its position with relation to the feeding belt of a threshing machine.

Fig. 2 represents a vertical longitudinal sectional view through the hood, the feeding belt being shown in position therein, and, Fig. 3 represents a fragmentary side elevation of a conventional type of threshing machine illustrating the attachment applied to use thereon.

Referring to the drawing in detail, wherein similar reference numerals designate corresponding parts throughout the several views, the numeral 10 indicates a frame structure which constitutes a form and support for a dust receiving and conducting hood designated by the numeral 2.

The opposed side walls 1ª of the hood are arranged over the sides of the frame structure 1 and the upper portion of the latter is closed by a covering or top 3 which is of tapering formation and receives a dust conducting pipe 4 which latter, as will be understood, may be extended to any desired point remote from the hood for the discharge of the dust conducted thereby.

The rear end 1 of the hood is left open to permit bundles of grain to pass therethrough while the front end of the hood is normally closed by a flexible curtain 7. The curtain 7 is secured along its upper edge to the material of the hood and normally hangs in such position as to close the front end of the hood and prevent escape of dust therefrom.

In applying the invention to use, the frame structure 10 is adequately supported above the supporting frame 11 for the feeding conveyer of conventional types of threshing machines 12. The hood is so positioned that the open front end 1 thereof is disposed adjacent the housing 13 for the band cutting mechanism while the feeding conveyer 5 is completely inclosed by the hood, as illustrated in Fig. 2. In operation, the flexible curtain 7 is lifted and the bundles of grain deposited upon the feeding conveyer 5 in the usual manner. As the bundles are deposited upon the conveyer the curtain 7 is permitted to fall to closed position thereby preventing the scattering of dust incident to the movement of the bundles and the cutting of the bands thereof.

I claim:

1. A dust conveying attachment for the feeding mechanism of a threshing machine including a frame structure having a tapered upper portion, a hood arranged upon the frame constructed of flexible material and having receiving and discharge openings in the opposite ends thereof and an outlet port in the upper portion thereof, and a flexible closure for the receiving opening of the hood adapted to be swung outwardly to permit insertion of bundles of grain in the hood.

2. A dust conveying attachment for the feeding mechanism of a threshing machine including a frame structure having a tapered upper portion, a hood for said frame constructed of flexible material and having inlet and outlet openings in the opposite ends thereof and an outlet opening in the upper portion thereof, and a flexible curtain secured at its upper edge to the hood and extending downwardly and normally closing the inlet opening and adapted to be displaced to permit of insertion of bundles of grain in the hood.

In testimony whereof, I affix my signature hereto.

JOHN KOTERSKE.